United States Patent [19]

Howell et al.

[11] Patent Number: 4,928,113
[45] Date of Patent: May 22, 1990

[54] CONSTRUCTIONS AND FABRICATION METHODS FOR DROP CHARGE/DEFLECTION IN CONTINUOUS INK JET PRINTER

[75] Inventors: Margene C. Howell, Dayton; James A. Katerberg, Kettering; David N. Pipkorn, Centerville; Wendell L. Wood, Dayton, all of Ohio

[73] Assignee: Eastman Kodak Company, Rochester, N.Y.

[21] Appl. No.: 264,737

[22] Filed: Oct. 31, 1988

[51] Int. Cl.$^5$ ............................................. G01D 15/18
[52] U.S. Cl. ...................................................... 346/75
[58] Field of Search ............................ 346/75, 140 R

[56] References Cited

U.S. PATENT DOCUMENTS

| | | | |
|---|---|---|---|
| 4,364,067 | 12/1982 | Koto et al. | 346/140 R |
| 4,551,731 | 11/1985 | Lewis et al. | 346/75 |
| 4,560,991 | 12/1985 | Schutrum | 346/75 |
| 4,636,808 | 1/1987 | Herron | 346/75 |

Primary Examiner—Clifford C. Shaw
Assistant Examiner—Gerald E. Preston
Attorney, Agent, or Firm—John D. Husser

[57] ABSTRACT

An improved print head construction for continuous ink jet printing of the kind which directs a plurality of ink streams through a drop charge region toward a print zone. The print head includes: (i) charge electrodes located adjacent the drop charge region for selectively applying an information voltage to droplets; (ii) a deflection electrode(s) closely spaced to, and downstream from, the charge electrodes, for applying a deflection field to the droplets; and (iii) a dielectric matrix for integrally embedding the charge and deflection electrodes in closely spaced relation. Methods for fabricating such print heads are also disclosed.

12 Claims, 5 Drawing Sheets

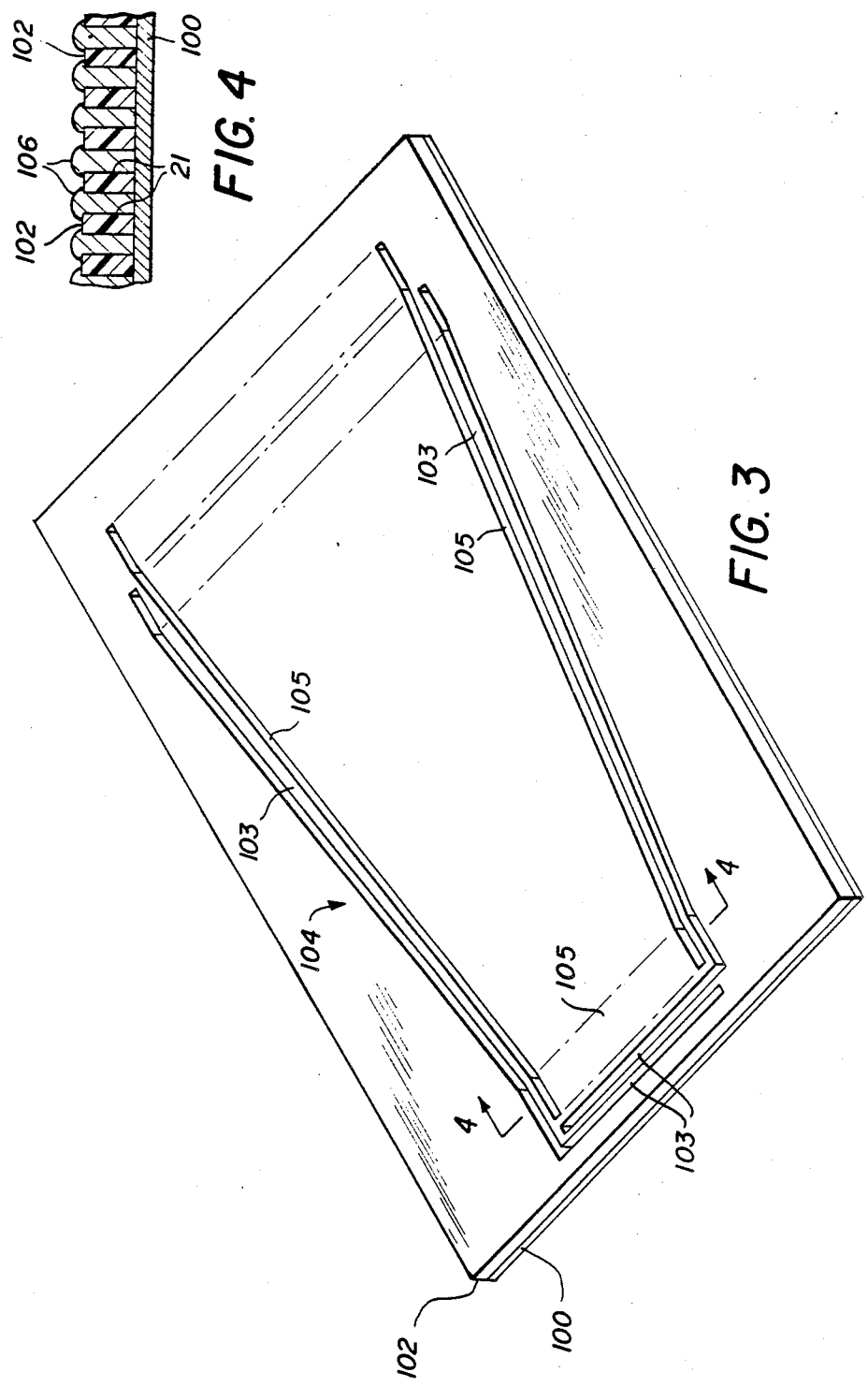

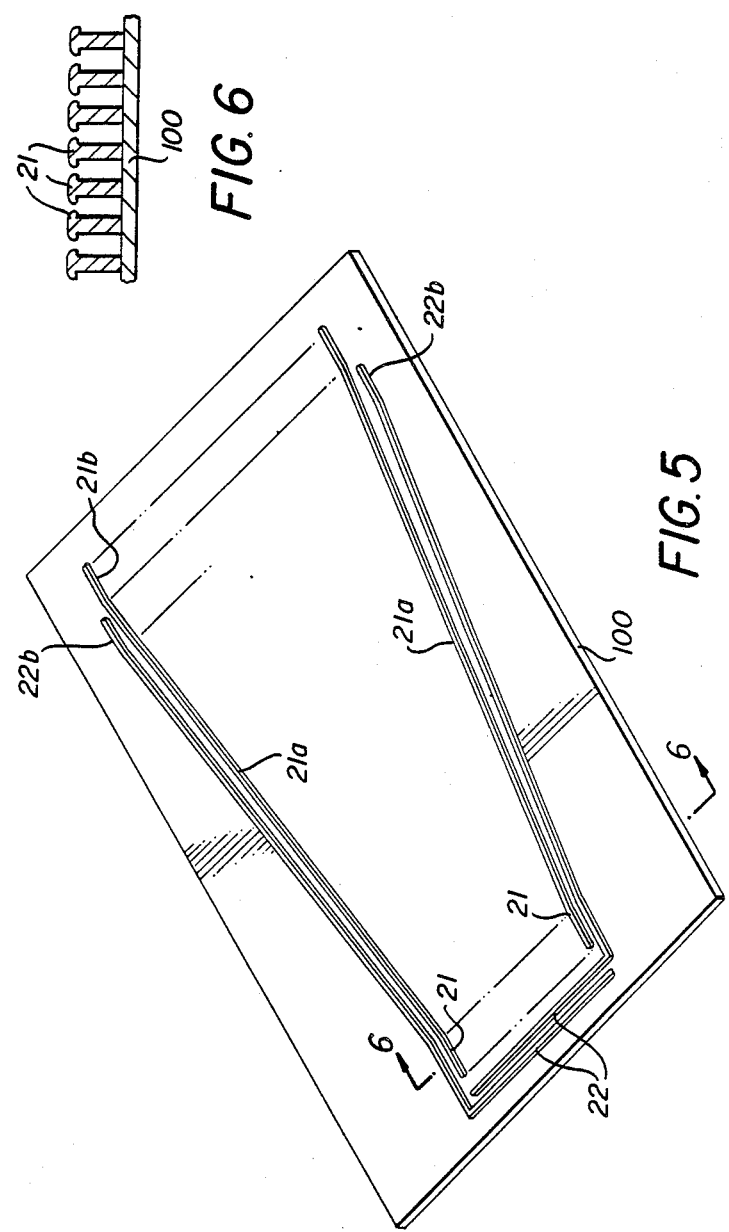

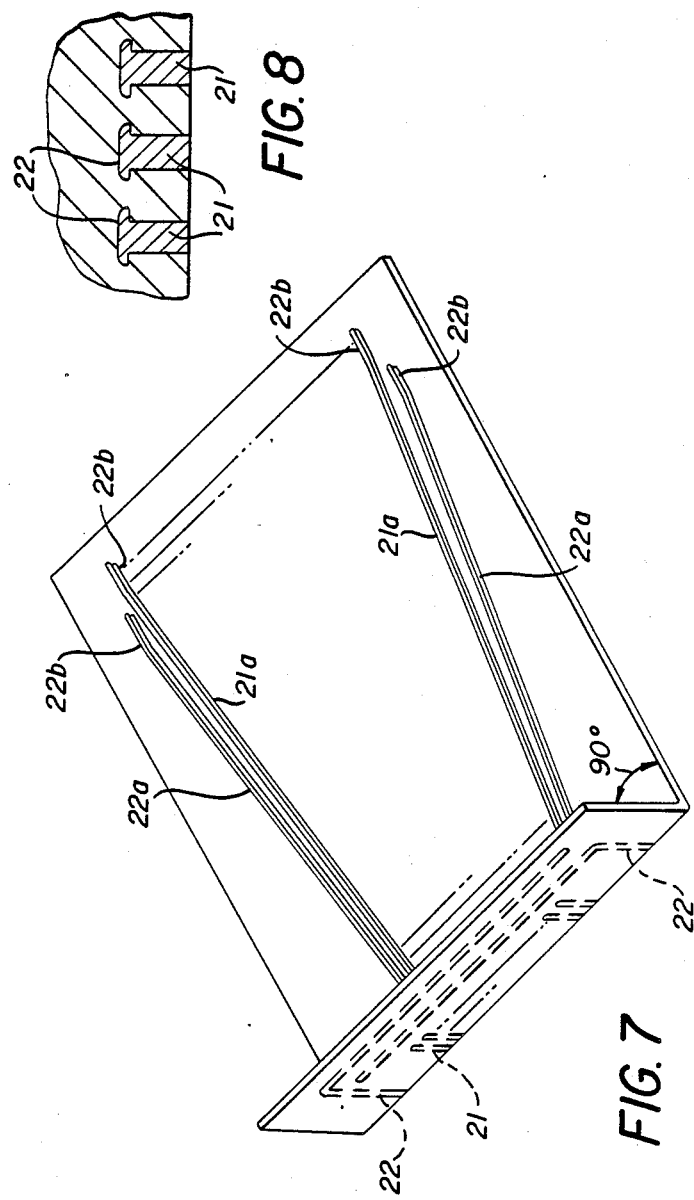

CONSTRUCTIONS AND FABRICATION METHODS FOR DROP CHARGE/DEFLECTION IN CONTINUOUS INK JET PRINTER

FIELD OF INVENTION

The present invention relates to print head devices for continuous ink jet printers and more particularly to: (i) improved drop charging and drop deflecting structures of such devices and (ii) methods of making such improved structures.

BACKGROUND OF INVENTION

In continuous ink jet printing, print head devices are constructed to: (i) form ink streams which break up within a drop charging region into drop streams of uniformly sized and spaced ink drops, (ii) selectively impose electrical charge on some drops at stream breakup in accord with an information signal and (iii) deflect charged drops to a predetermined trajectory, which can be either a print trajectory or a "caught" trajectory. The "caught", non-printing drops are returned to the ink reservoir and recirculated to the print head.

Most prior art print head assemblies employ drop charge electrodes adjacent the drop formation point and drop deflection electrodes that are separate of, and spaced downstream from, the charge electrode. U.S. Pat. No. 3,656,171 discloses a prior art technique wherein a single electrode structure extends from the drop breakup region to the drop catch region and functions as both the drop charging and drop deflection electrode. U.S. Pat. No. 4,636,808 discloses an improvement over the '171 patent wherein a "non-extended" charge and deflection electrode that has a path length dimension of only about 6 drop spacings or less, provides combined drop charging and drop deflecting functions. The '808 patent approach has the significant advantage of removing the electrodes from contact with charged ink drops while still eliminating the need for a separate deflection electrode structure.

The '808 patent system for combining the functions of drop charging and deflection into a single, short electrode works quite well. However, we have found that the drop deflections which are produced by that system are not uniform and vary based on the charge or non-charge selection as to subsequent drops. This can be understood by conceptually separating the charging and deflection functions of the combined charge/deflection plate. The upper region of that plate, adjacent to the break off point, produces the drop charging. The lower region of that plate will have several print or catch drops in front of it and serves as a deflection electrode. To produce a print drop (e.g. uncharged) the charge voltage on the combined charge/deflection plate is switched to 0 volts for 1 stimulation cycle. This switching off of the charge voltage also turns off the deflection field in front of the lower region of the combined plate and the deflections of the drops in front of the lower part of the charge plate are thus reduced (in comparison to the deflections imparted when the plate is charging a drop).

The trajectories of charged drops in the '808 system therefore can range between a maximum deflection (where the combined plate is charging all drops during a drop passage past the plate) and a minimum deflection (where the plate is energized only to charge that drop and thereafter grounded). While such non-uniformities in deflected drop trajectories of the '808 patent system do not prevent good printing operations, they do present overall printer design constraints that are undesirable. For example, the range of possible trajectories necessitates a relatively high charge electrode voltage, i.e. reduces the charging voltage range over which proper printing is possible.

SUMMARY OF THE INVENTION

Thus one important purpose of the present invention is to provide a print head construction that maintains much of the simplicity of the combined charge/deflection electrode approach but also eliminates printer design problems that evolve from the inconsistent drop deflections of that approach.

In one preferred embodiment, the present invention constitutes in ink jet printing apparatus, an improved print head construction comprising: (a) means for directing a plurality of ink streams through a drop charge region and a deflection region toward a print zone; (b) charging means including charge electrodes located adjacent the drop charge region and means for selectively applying an information voltage to the charge electrodes; (c) deflection electrode means including a deflection electrode closely spaced to, and downstream from, the charge electrodes and means for applying a deflection voltage to the deflection electrode; and (d) dielectric means for integrally embedding the charge and deflection electrodes in such closely spaced relation.

In another aspect the present invention constitutes a method of fabricating an improved charge and deflection electrode component for a continuous ink jet print head, such method comprising: (a) forming on a substrate a photoresist pattern comprising outline boundaries of: (i) a plurality of charge electrodes having lead connector portions extending therefrom and (ii) a deflection electrode closely spaced to the charge electrodes and having a lead connectors portion extending therefrom; (b) electroplating within said outline boundaries to form discrete conductive elements within the boundaries; (c) bending the substrate to dispose the charge and deflection electrode elements at approximately 90% to their lead connector portions; (d) removing the photoresist; (e) embedding the exposed portions of the electrodes and lead connector portions in a dielectric matrix; and (f) removing the substrate to expose face surfaces of the electrodes and lead connector portions.

The advantages provided by constructions in accord with the present invention are several. For example, the uniformity of deflection provided by such constructions enables a reduction in the requisite charge voltage and in some embodiments enables a common voltage source for the charge and deflection electrodes. The uniformity of deflection trajectory also causes a uniformity of drop impact location on the catcher assembly which simplifies catcher constrictions and improves the reliability of ink return. Further, the integration of charge and deflection electrode structures in accord with the present invention, provides the advantages of a separately addressable electrode, while still allowing cleaning of such separate electrode by the processes described in U.S. Pat. No. 4,600,928. In certain embodiments the closely spaced, but electrically discrete, electrode structures of the invention can be used to effect simplified stimulation adjustment and to provide electrohydrodynamic stimulation of the jet stream. In addition, the print head constructions in accord with the present invention are simple in fabrication and avoid difficult assembly positioning usually necessary to assure accurate interspacing between charge and deflection electrode structure.

BRIEF DESCRIPTION OF THE DRAWINGS

The subsequent description of preferred embodiments of the invention refers to the accompanying drawings wherein:

FIGS. 3 and 4 illustrate a preferred technique for fabricating charge/deflection plate assemblies such as shown in FIG. 2, in one of the initial stages of the fabrication process;

FIGS. 5 and 6 illustrate the fabrication process at a subsequent stage;

FIGS. 7 and 8 illustrate the fabrication process at still subsequent stages;

DETAILED DESCRIPTION OF PREFERRED EMBODIMENTS

Figure 1:
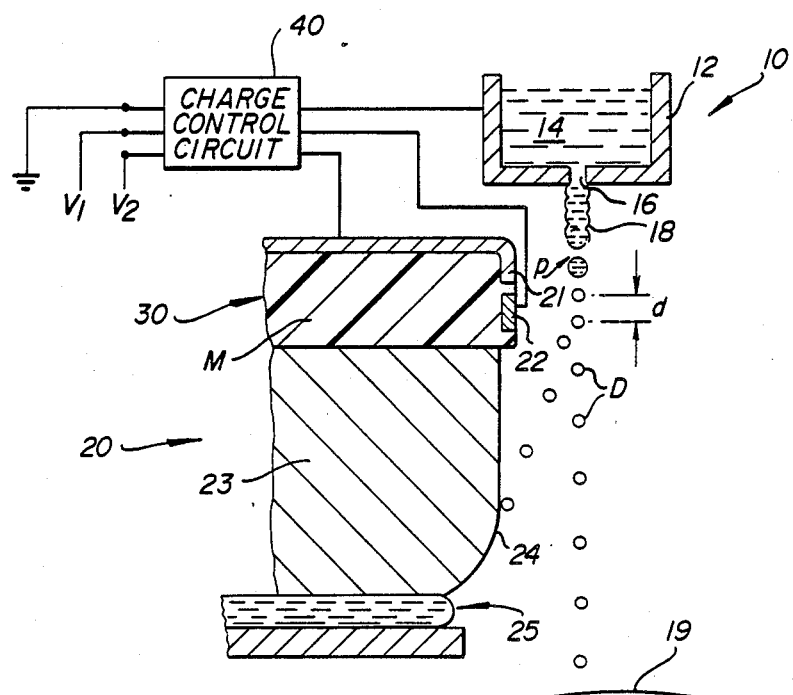
FIG. 1 is a schematic side view of an ink jet printer incorporating one preferred embodiment of the present invention.

Referring now to FIG. 1, the continuous ink jet printer 10 comprises a print head reservoir 12 to which a supply of ink 14 is continuously supplied under pressure by a circulation system (not shown). At the bottom of reservoir 12 an orifice array 16 is provided so that ink stream filaments 18 are directed toward a print zone, e.g., a strip on a sheet print media supported on print platen 19. Stimulating vibration is imposed on ink egressing orifice 16 (e.g. by a stimulation system such as described in U.S. Pat. No. 4,646,104, not shown) to cause the ink filaments to break up at a predetermined location into a plurality of uniformly sized ink droplets D having a uniform drop spacing "d". The location of the drop break off point "p" of the filament 18 is controlled by the ink jet printer system (e.g. by regulating the amplitude of the vibrations imposed on the ink filament) to be approximately opposite along the drop path from the charge electrodes 21.

Figure 2:
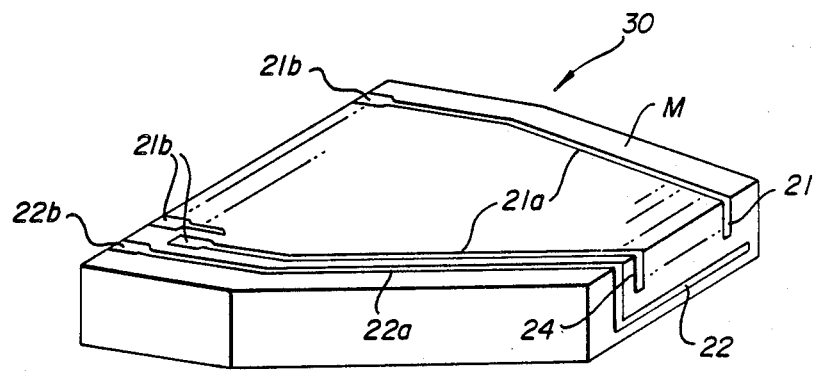
FIG. 2 is an enlarged perspective view schematically illustrating the charge and deflection plate assembly of the FIG. 1 apparatus.

In addition to the charge electrodes 21, the lower print head assembly 20 comprises a drop deflection electrode(s) 22 and a catcher body portion 23 including a drop impact surface 24 and an ink return channel 25. Referring to FIG. 2, as well as FIG. 1, it can be seen that the drop charging and drop deflecting assembly 30 comprises an integral construction which can be mounted atop the catcher body portion 23. More specifically, the plurality of drop charge surfaces 21 each has a respective connector pad portion 21b located at a rear region of the assembly and lead portion 21a coupling the charge surface portion 21 to the pad portion 21b. Each of these portions 21, 21a and 21b preferably are embedded in a matrix M of dielectric material, e.g. epoxy resin. Also embedded in matrix M is the deflecting field surface 22 of the deflection electrode and its lead and connector pad portions 22a and 22b.

In operation, the pad portions 21b and 22b of assembly 30 are coupled to the charge control circuit (denoted generally 40) of the printer 10 and improved printing can be effected in accord with the present invention as follows. Thus as drops D break off of filaments 18 at points "p" adjacent the charge faces 21 of the charge electrodes, circuit 40 selectively energizes specific ones of the charge electrodes 21, in accord with a print information signal, to selectively charge nonprint drops to a potential, e.g., $V_1$. The conductive ink filament is at ground potential, and a charge of opposite polarity to voltage $V_1$ is induced on charge drops.

Control circuit also continuously energizes deflection electrode 22 to a predetermined voltage $V_2$. The continuous deflection field (formed by voltage $V_2$) consistently attracts the oppositely charged droplets to a catch trajectory as shown in FIG. 1. Moreover, the proximity of the deflection electrode 22 to the grounded jet stream and orifice plate enables those ground potential sources to serve as the "ground electrode" for a highly effective drop deflecting field, which enables a smaller deflection voltage than in prior art systems. Non-charged drops are not attracted and pass along the print trajectory toward platen 19, as shown and FIG. 1.

In accord with the present invention, we have found it preferable to have: (i) the charge electrode surface to be in the range of about one to three drop spacings "d" in length along the drop path. The important limits in this regard are that the charge electrode length be adequate to assure uniform drop charging across the width of the array but not so long as to impair the deflection field (by too distant a spacing of the deflection electrode from the grounded orifice plate in ink filament). For the same reason it is desirable that the dielectric spacer element have the minimum length along the path that will electrically isolate the charge and deflection electrodes. One drop spacing or less of length is desirable. The deflection electrode is desirably at least about two drop spacings in length along the drop path and can be as long as necessary to effect proper deflection. Two to three drop spacings in length is usually adequate. In one example where the jet stream drop spacing was about 4 mils, a charge electrode surface of 4 mils and a deflection electrode surface of about 10 mils, separated by a dielectric surface of about 3 mils, was preferred. In one preferred construction the top of charge plate 21 is spaced about 7 mils from orifice 16 and the faces of charge electrode 21, 22 are about 2.5 mils from the center of the ink filament.

While the charge circuit 40 is shown and described above as having separate charge and deflection voltages $V_1$, $V_2$, it is preferred in accord with the present invention that $V_1$ and $V_2$ be approximately equal or even more preferably from the same voltage source. D.C. voltages in the range of from about 80 to 140 volts are desirable and a voltage of about 100 volts is preferred with the jet to charge plate spacing of about 2.5 mils as described above. These voltage parameters will vary depending on electrode constructions and jet to charge plate spacing.

Also, while the deflection electrode means is shown in FIGS. 1 and 2 as comprising a single electrode 22, it can also be formed as a plurality of parallel electrodes as shown in FIG. 3. The provision of a plurality of deflection electrodes is preferred from the fabrication view-point of enabling more reliable attachment in the dielectric matrix.

Referring now to FIGS. 3-6, one preferred fabrication method for constructing a combined charge/deflection electrode assembly, in accord with the present invention, is illustrated. In this method of fabricating the assembly, a pattern 104 defining the charge and deflection electrode surfaces and their associated connecting structures is formed in a covering 102 which is resistant to plating operations and supported on a substantially planar foil sheet 100. In FIG. 3, the outlines for the charge electrodes and related connection circuits are denoted 105 and the outlines for the deflection electrodes and their related connection circuits are denoted 103. Preferably, the foil sheet 100 is copper and the pattern 104 is formed by initially laminating a photoresistive film, as covering 102, to the foil sheet, exposing the photoresistive covering to actinic light through a photomask to define the electrode and circuit path pattern and removing the portion of the covering corresponding to the pattern to expose the surface of the copper foil thereunder.

The foil sheet is then plated through the exposed pattern 104 with an electrically conducting material, preferably nickel, to form charge electrodes 21 and the associated connecting circuit structures 21a, 21b and deflection electrodes 22 and their associated connecting circuit structures 22a, 22b, see FIG. 5. The electrodes and associated circuit leads are preferably formed to a thickness which exceeds the thickness of the photoresistive covering as shown in FIG. 4. By plating to a thickness beyond that of the photoresistive covering, the plated material extends above and expands over the upper surface of the covering to form retaining flanges 106 on each of the electrodes and circuit leads. The plating operation is limited such that no two of the flanges interconnect with one another. The remainder of the photoresistive covering is then thoroughly removed from the foil sheet such that the electrodes and the connecting circuit leads with their retaining flanges extend above the surface of the foil sheet as shown in FIGS. 5 and 6.

The foil sheet is then bent toward the plated material with at least a portion of the electrodes being bent and angularly oriented, at approximately a 90% angle, relative to the circuit leads as shown in FIG. 7. The bending step can if desired be performed before removal of photoresist layer 102.

A dielectric matrix is then formed to surround the plated material including the retaining flanges as shown in FIG. 8. The matrix is formed to have two of its exterior surfaces defined by the interior of the foil sheet. The foil sheet is then removed from the matrix and embedded plated material, e.g. by etching. This exposes surfaces of the plated material electrodes and circuit leads with the remainder embedded within the substrate and preferably anchored thereto by means of retaining flanges 106. The combined assembly with foil sheet 100 removed is as shown in FIG. 2.

Preferably, the embedding procedure is effected by clamping the bent foil sheet into a mold with the portion of the sheet including the connecting circuit leads being clamped to the mold as well as the bent portion of the sheet. This ensures flatness of those portions of the substrate after formation. The dielectric substrate is then formed by inserting molding material, such as an epoxy resin, into the mold and curing the molding material to form the dielectric substrate. Charge electrodes formed by this technique can have a rounded top edge and in this event the electrode length along the path direction can be extended to, e.g., 9 mils so that a portion of 4 mils will exist at uniformly close spacing to the ink jet filament break off zone. Further details of this preferred procedure for forming the integral charge/deflection assembly can be generally as described in U.S. Pat. No. 4,560,991.

Figure 9:
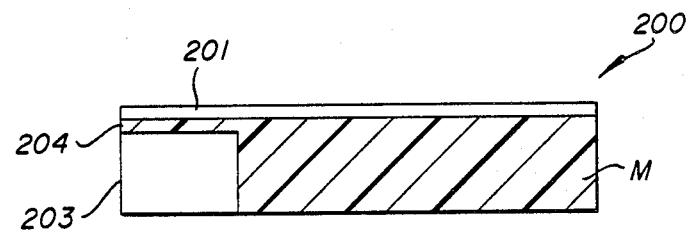
FIG. 9 is a cross-sectional view illustrating a charge deflection plate made by another preferred fabrication process according to the present invention.

FIG. 9 illustrates a charge deflection plate 200 constructed in an alternative fabrication process of the present invention. This fabrication is effected by plating the charge electrode structure 201 over a photoresist pattern as described with respect to FIGS. 3 and 4 and removing the photoresist as described with respect to FIGS. 5 and 6. Without bending the substrate, the substrate and supported charge electrode structures are placed in a molding fixture and a deflection electrode 203 held above the charge electrode structure by a spacing that defines the insulator gap 204. The elements are then molded in a matrix of dielectric material M. After the molding process is completed, support substrate is etched off and the face of the charge plate is ground or lapped to a flat surface yielding the FIG. 9 structure. The FIG. 9 fabrication has a very small top radius so that the operative charge electrode surface can be only about 3-5 mils. The dielectric spacing structure can be about 3 mils and the deflecting electrode surface about 10-20 mils. In a further alternative embodiment the deflection electrode 203 can be laminated to the charge electrode surface 201 with a dielectric adhesive which defines gap 204.

Figure 10:
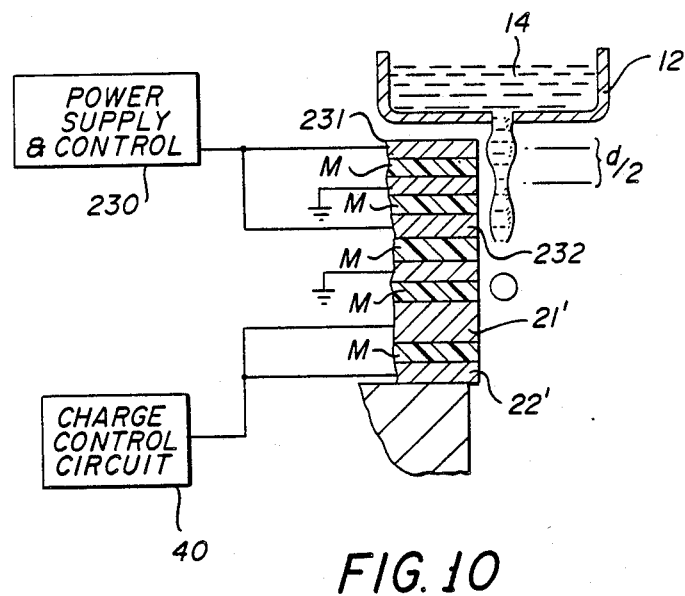
FIG. 10 is a schematic cross section view illustrating another embodiment of charge/deflector construction according to the present invention.

Referring now to FIG. 10, the combined charge/deflection plate construction of the FIG. 1 embodiment is integrated with an electrohydrodynamic stimulator system of the kind described in U.S. Pat. No. 4,220,958. Thus power and control 230 is coupled to pump electrodes 231, 232, which are separated from ground electrodes 233, 234 by dielectric matrix M. The electrodes are separated by one half a drop spacing d/2. The integral matrix M also couples charge electrode 21' and deflection electrode 22' with intermediate spacer material M so that the drops formed by the electrohydrodynamic stimulator system are charged and deflected by the integral charge/deflection plate 21', 22'.

The invention has been described in detail with particular reference to preferred embodiments thereof, but it will be understood that variation and modifications can be effected within the spirit and scope of the invention.

I claim:

1. In continuous ink jet printing apparatus, an improved print head construction comprising:
    (a) means for directing a plurality of ink streams through a drop charge region toward a print zone;
    (b) charging means including charge electrodes located adjacent said drop charge region and means for selectively applying an information voltage to said charge electrodes;
    (c) deflection means including a deflection electrode(s) spaced downstream from said charge electrodes by about one nominal drop spacing or less and means for applying a deflection voltage to said deflection electrode; and
    (d) dielectric matrix means for integrally embedding said charge and deflection electrodes in said closely spaced relation.

2. The invention defined in claim 1 wherein said voltage applying means for said charging and said deflection electrodes apply approximately equal magnitude voltages.

3. The invention defined in claim 2 wherein said charging and deflection electrodes have a common voltage source.

4. The invention defined in claim 1 wherein charge electrodes have a path length dimension in the range of about one to three drop spacings and said deflection electrode(s) are located along said path length within about one drop spacing of said charging electrodes.

5. The invention defined in claim 4 wherein said deflection electrode(s) have a path length dimension of at least about two drop spacings.

6. The invention defined in claim 1 wherein said charging and deflection electrodes are electroplated elements and said dielectric means is a matrix molded around said elements.

7. The invention defined in claim 6 wherein said print head construction further comprises stimulation electrodes embedded in said dielectric matrix in spaced relation to said charge and deflection electrodes.

8. The invention defined in claim 1 wherein said deflection electrode means comprises at least one elongated strip perpendicular to said charge electrodes.

9. The invention defined in claim 8 wherein said deflection electrode means comprises a plurality of spaced strips, perpendicular to said charge electrodes, and each embedded in said matrix.

10. In continuous ink jet printing apparatus, an improved print head construction comprising:
 (a) means for directing a plurality of ink streams through a drop charge region toward a print zone;
 (b) charging means including charge electrodes having charge surfaces extending along said drop charge region for about one to three drop spacings and means for selectively applying an information voltage to said charge electrodes;
 (c) deflection electrode means including a deflection electrode(s) closely spaced to, and downstream from, said charge electrodes and means for applying a deflection voltage to said deflection electrode(s); and
 (d) dielectric means located between said charge and deflection electrodes and separating those electrodes by less than about one drop spacing.

11. The invention defined in claim 10 wherein charge electrodes have a path length dimension of about 4 mils and said deflection electrode is located within about 3 mils of said charging electrodes.

12. The invention defined in claim 11 wherein said deflection electrodes have a path length dimension of about 10 mils.

* * * * *